United States Patent [19]
Grant

[11] 4,279,592
[45] Jul. 21, 1981

[54] HEAT EXCHANGER FOR PRE-HEATING INTAKE AIR FOR ROTARY DRYER

[75] Inventor: Herman L. Grant, Chattanooga, Tenn.

[73] Assignee: Herman Grant Co., Inc., Chattanooga, Tenn.

[21] Appl. No.: 109,156

[22] Filed: Jan. 2, 1980

[51] Int. Cl.$^3$ .................. F27B 7/36; F24H 1/00
[52] U.S. Cl. .................. 432/105; 432/107; 432/219; 432/223
[58] Field of Search .............. 432/103, 105, 106, 107, 432/219, 223

[56] References Cited
U.S. PATENT DOCUMENTS

| | | | |
|---|---|---|---|
| 1,381,026 | 6/1921 | Snyder | 432/107 |
| 1,836,139 | 12/1931 | Trumble | 432/105 |
| 4,191,530 | 3/1980 | Bearce | 432/107 |

Primary Examiner—John J. Camby
Attorney, Agent, or Firm—Harrington A. Lackey

[57] ABSTRACT

A pre-heating chamber of transversely arcuate shape adapted to be mounted above a longitudinal portion of a rotary dryer chamber adjacent the combustion chamber of a drying apparatus for drying aggregate, such as used in the manufacture of asphalt paving composition, in which ambient air is circulated through the pre-heating chamber and then discharged through a duct means to the air intake of the combustion chamber.

The pre-heating chamber is preferably divided into a radially outer air intake passage communicating at one end with a radially inner air discharge passage to provide a more effective heat transfer between the pre-heating chamber and the rotary dryer chamber.

8 Claims, 4 Drawing Figures

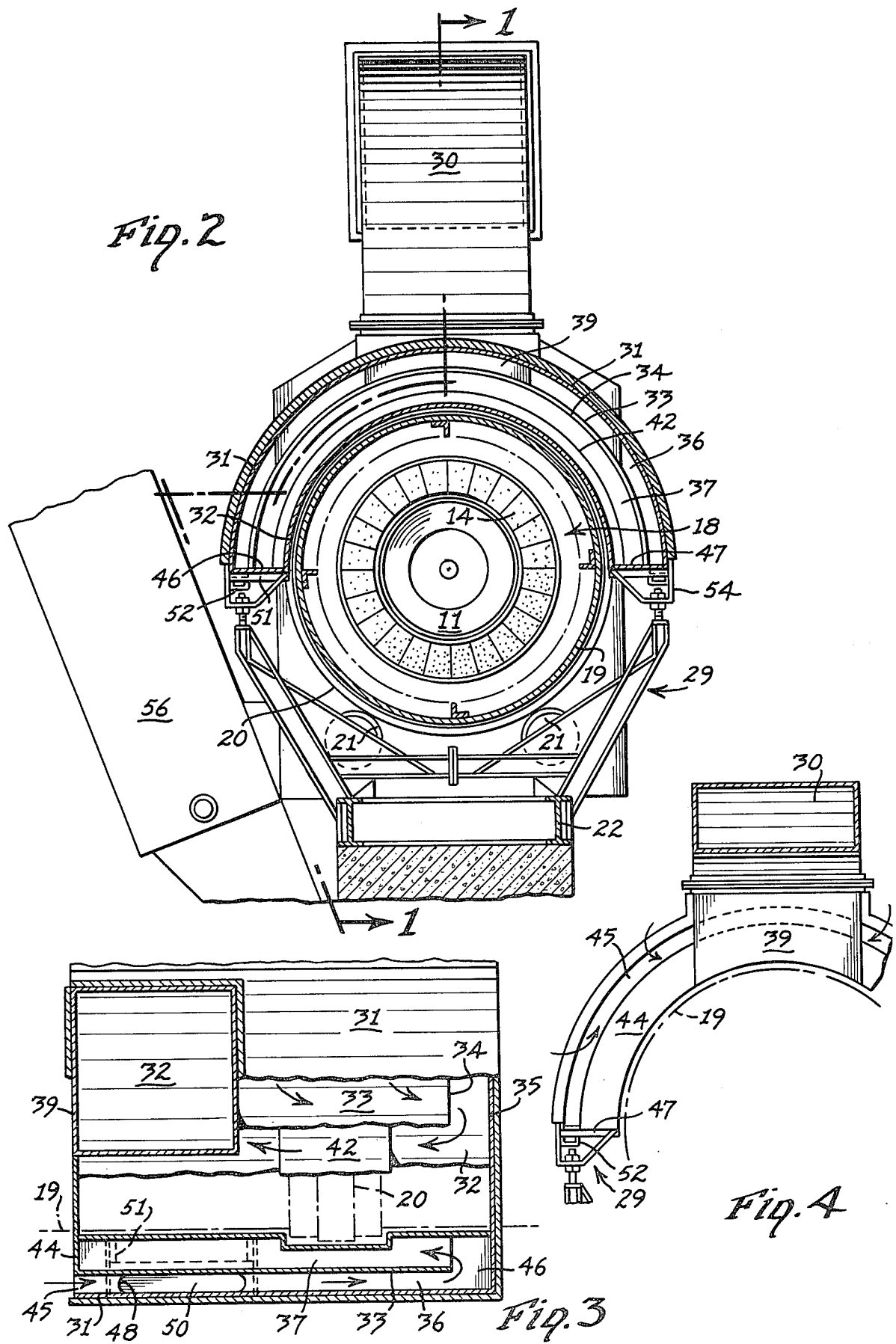

HEAT EXCHANGER FOR PRE-HEATING INTAKE AIR FOR ROTARY DRYER

BACKGROUND OF THE INVENTION

This invention relates to an air pre-heater device, and more particularly to a heat exchanger mounted on a rotary dryer for pre-heating air to the dryer combustion chamber.

Heat exchangers of various types are well known in the art for recovering heat in various combustion processes, and for utilizing the recovered heat for various purposes, including pre-heating air or other fluid.

SUMMARY OF THE INVENTION

It is an object of this invention to provide an especially constructed pre-heating chamber adapted to be mounted in heat exchange relationship with the hottest part of a rotary dryer chamber of a type adapted to dry aggregate for use in the manufacture of asphalt paving compositions. The pre-heating chamber is coupled to the air intake of the combustion chamber so that the heated air from the pre-heating chamber is channeled back to the air intake to improve the efficiency of the combustion.

The pre-heating chamber has an arcuate saddle-shape, semi-cylindrical and concave downward, and adapted to be concentrically mounted above and in closely spaced heat transfer relationship to the lower end portion of the slightly inclined rotary dryer chamber. The lower end portion is the hottest part of the dryer chamber since it is adjacent to the combustion chamber.

The pre-heating chamber preferably has an intermediate semi-cylindrical partition wall which terminates longitudinally adjacent the rear end of the pre-heating chamber. The partition wall divides the pre-heating chamber into a radially outer, substantially semi-cylindrical, air inlet passage and a radially inner substantially semi-cylindrical, air discharge passage. The air inlet passage and the air discharge passage communicate in the space between the terminal edge of the partition wall and the rear end of the pre-heating chamber. An air inlet port communicates with the front end of the air inlet passage, while an air discharge duct communicates with the front end portion of the air discharge passage. Thus, ambient air is circulated first rearward through the outer air inlet passage and then forward through the inner discharge passage adjacent the heated cylindrical wall of the rotary dryer chamber. The hot air from the inner air passage is then discharged through the stack and then through a duct to the air intake of the combustion chamber, where the pre-heated air supports the combustion of the fuel in the combustion chamber and then is forced into the lower open end of the rotary dryer chamber to dry the aggregate.

Since the radial inner air passage is much hotter than the radial outer passage, heat is transferred radially outward through the semi-cylindrical partition wall to pre-heat the ambient air moving rearward through the outer air passage.

Moreover, heat radiated from the discharge stack also pre-heats air in the air inlet passage. Thus, the pre-heated air is in turn pre-heated.

BRIEF DESCRIPTION OF THE DRAWINGS

FIG. 2 is a fragmentary section taken along the line 2—2 of FIG. 1;

FIG. 3 is a fragmentary section taken along the line 3—3 of FIG. 1; and

FIG. 4 is a fragmentary section taken along the line 4—4 of FIG. 1.

DESCRIPTION OF THE PREFERRED EMBODIMENTS

Figure 1:
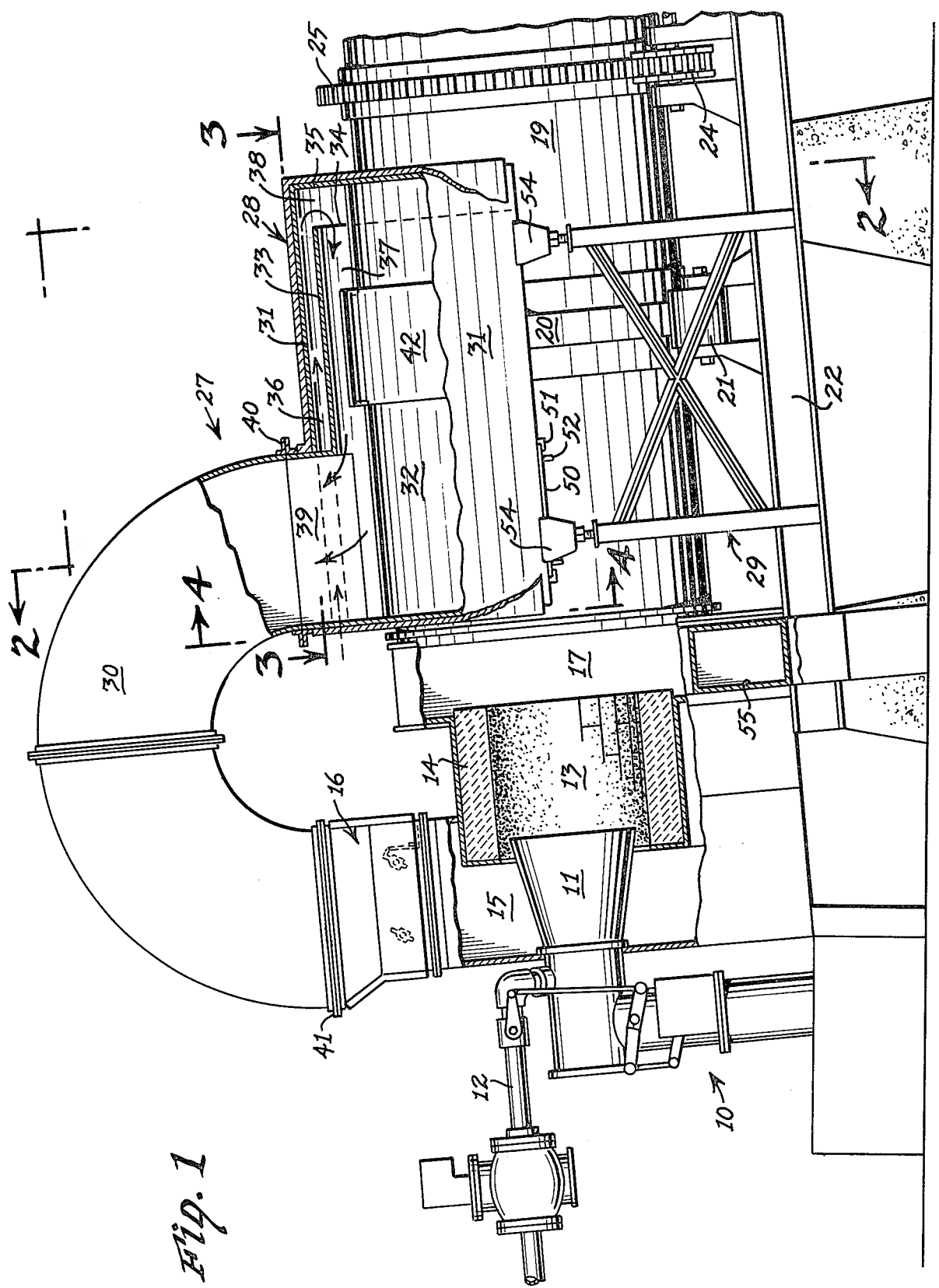
FIG. 1 is a fragmentary side elevation, partially in section of an aggregate drying apparatus upon which the pre-heating chamber is operatively mounted, portions of which are broken away and also shown in section taken along the line 1—1 of FIG. 2.

Referring now to the drawings in more detail, FIG. 1 discloses dryer apparatus 10 of the type particularly adapted for drying aggregate to be used in the manufacture of an asphalt paving composition for paving highways, roads, driveways, etc. The dryer apparatus 10 includes a conical-shaped burner 11 having a fuel intake line 12 and adapted to burn fuel, such as gas or oil. The burner 11 opens into a combustion chamber 13, illustrated as a cylindrical-shaped wall of refractory materials, such as fire brick 14. Air for combustion is supplied to the combustion chamber 13 through an air intake chamber 15 and air intake 16. The products of combustion from the combustion chamber 13 are discharged across the materials discharge chamber 17 and into the lower open end of the cylindrical dryer chamber 18 defined by the rotary cylindrical shell or wall 19.

The cylindrical dryer shell 19 is provided with a plurality of circumferential tires 20 mounted on rotary idler bearings 21 upon the dryer frame 22 for rotary movement about the longitudinal cylindrical axis of the dryer shell 19, which is slightly inclined at an angle to the horizontal, with its lower end being in communication with the combustion chamber 13 and the materials discharge chamber 17.

The materials to be dried, such as the aggregate, are introduced into the upper end of the rotary cylindrical shell 19, not shown, in a conventional manner, and gradually gravitate down the dryer chamber toward the material discharge chamber 17, in a well-known manner.

The cylindrical shell 19 may be driven by small bearing gears 24, which in turn are driven by motors, not shown, and which engage the large ring gear 25 circumferentially around the cylindrical shell 19, as illustrated in FIG. 1.

The pre-heater device 27 includes a pre-heating chamber 28, a support frame 29 and duct means 30.

The pre-heating chamber 28 is preferably of generally semi-cylindrical arcuate shape in its transverse dimension, and of a predetermined length substantially less than the overall length of the rotary cylindrical dryer shell 19. The pre-heating chamber 28 includes an outer, substantially semi-cylindrical wall 31 concentric with the cylindrical shell 19, and a substantially semi-cylindrical inner wall 32 of the same length as the outer wall 31, spaced inward from the outer wall 31 and also concentric with the cylindrical shell 19. Between the outer wall 31 and the inner wall 32 is a substantially semi-cylindrical intermediate partition wall 33, not quite as long as the walls 31 and 32, substantially flush with the front edges of the walls 31 and 32, but terminating in a rear edge 34 spaced forwardly of a substantially semi-cylindrical rear wall 35, joining the outer and inner walls 31 and 32 to close the space therebetween.

Thus, the outer wall 31 and the intermediate wall 32 define a longitudinally extending transversely arcuate, outer air inlet passage 36, while the intermediate wall 33 and the inner wall 32 define a longitudinally extending, transversely arcuate, inner air discharge passage 37. The outer air passage 36 and the inner air passage 37 communicate with each other through the rear end passage 38 defined by the rear edge 34 of the intermediate partition wall 33 and the rear end wall 35.

Air is discharged from the inner air discharge passage 37 through a stack member 39 communicating with the front upper portion of the inner passage 37 and projecting upward through the air inlet passage 36, where the stack member 39 is coupled to one end of the duct means 30 by coupling member 40. The opposite end of the duct means 30 is connected by coupling member 41 to the air intake 16 for the combustion chamber 13.

The inner wall 32 is provided with an annular recessed portion 42 to provide space for radially projecting, circumferential, tire 20, as illustrated in FIG. 1.

The front end of the inner air discharge chamber 33 is closed by a front end wall 44 of semi-cylindrical shape. On the other hand, a major part of the front end portion of the outer air inlet passage 36 is left open to form the semi-circularly shaped air inlet 45. The air inlet 45 is completely open, except where closed by the stack member 39 (FIG. 4).

The lower end portions of the air passages 36 and 37 are closed by the elongated horizontally bottom plates 46 and 47.

An auxiliary air inlet port 48 in the shape of an oblong opening is formed longitudinally in the bottom plate 46 (FIG. 3). The air inlet port 48 is adapted to be opened and closed by a rectangular slidable gate 50. The gate 50 is adapted to be moved transversely between open and closed positions, and intermediate positions in which the size of the opening through the port 48 varies, according to the amount of additional ambient air desired in the air inlet passage 36. The gate 50 slides in the guide ways 51 and may be provided with handles 52 to facilitate slidable movement. An auxiliary air inlet port identical to the port 48 is also provided in the bottom plate 47, although it is hidden from view in the drawings. This port is also adapted to be opened and closed by another gate 50 slidable in guide ways 51 with gate handles 52.

The support frame 29 is provided with brackets 54 for supporting the bottom plates 46 and 47 of the pre-heating chamber 28, the brackets 54 being adjustable in height to properly space the inner wall 32 at the desired radial distance from the outer surface of the cylindrical shell 19. A small amount of spacing between the inner wall 32 and the shell 19 is desired in order to prevent excessive heating of the inner wall 32 which might cause deterioration of the inner wall 32 over a period of time. Of course the desired spacing between the inner wall 32 and the cylindrical shell 19 will be determined by the amount of heat generated within the dryer shell 19.

In the operation of the invention, the pre-heating chamber 28 is mounted concentrically over the cylindrical shell 19 and attached to the brackets 54 of the support frame 29 in the desired heat transfer position. The duct elements 30, disclosed in the drawings as a pair of arcuate elbows, are coupled together and also coupled by the coupling member 40 to the stack member 39 and by the coupling member 41 to the combustion chamber air intake 16.

After the burner 11 is started, and the aggregate materials introduced into the upper end (not shown) of the rotating cylindrical shell 19, the drying of the aggregate within the rotary cylindrical shell 19 proceeds in a well-known manner. As the aggregate gravitates toward the lower end of the shell 19, it falls into the materials discharge chamber 17 and out through the discharge opening 55, where the dry aggregate is elevated on a conventional conveyor device 56 (FIG. 2) to the next stage of the process for making an asphalt paving mixture, not shown.

The air within the cylindrical shell 19, and particularly in the lower end portion of the drying chamber 18, adjacent the combustion chamber 13, rises and heats the upper portions of the cylindrical shell 19 to a substantially high temperature. Since the upper region of the lower end portion of the cylindrical shell 19 will be the hottest portion of the shell 19, the pre-heating chamber or housing 28 is preferably located directly above the lower end portion of the cylindrical shell 19, as illustrated in FIG. 1.

The high-temperature air from the cylindrical shell 19 is radiated toward the inner semi-cylindrical wall 32, which in turn is heated to a high temperature. Heat from the inner wall 32 is then transferred to the air within the inner air discharge passage 37, and also radiated to the intermediate wall 33. The heated air in the inner chamber 37 is discharged through the stack member 39 and the duct elements 30 into the air intake 16. The pre-heated air is mixed with the vaporized fuel from the burner 11 in the combustion chamber 13 in order to effect combustion at a greater efficiency than if ambient cool air were mixed with the vaporized fuel.

The inner air discharge passage 37 is supplied with ambient air from the atmosphere through the air inlet opening 45, the outer air passage 36, and through the rear end passage 38 into the air discharge passage 37. The air from the atmosphere entering the air inlet passage 36 is pre-heated by heat radiating from the stack member 39 which intercepts air flowing through inlet passage 36, and is also pre-heated by the transfer of heat from the intermediate partition wall 33.

With the structural arrangement of the walls 31, 32, 33 and 35 in the pre-heating chamber 28, as well as the location of the stack member 39, substantial heat recovery is obtained in several different stages of air flow.

In preliminary tests of the apparatus, it has been found that the utilization of the pre-heater device 27 has effected a fuel savings of approximately 30 percent over a one-month period. Considering the massive quantities of fuel required to generate the large amounts of hot air for drying aggregate used in bituminous paving materials, the dollar amount of savings is substantial.

What is claimed is:

1. In a dryer apparatus for drying aggregate, including a rotary cylindrical dryer chamber adapted to rotate about its longitudinal cylindrical axis inclined at an angle to the horizontal, and having a lower end communicating with a combustion chamber having an air intake, a heat exchanger comprising:

(a) a pre-heating chamber having a longitudinal dimension and longitudinally spaced first and second end portions, said pre-heating chamber being transversely arcuate to fit over, and generally conform to, the cylindrical shape of the upper portion of said dryer chamber, (b) means mounting said pre-heating chamber above and in heat transfer relationship with a portion of said cylindrical dryer chamber, (c) a longitudinal, transversely arcuate, partition wall within said pre-heating chamber dividing said heating chamber into a radially outer air passage and a radially inner air passage, (d) said outer and inner passages being in fluid communication adjacent said second end portion of said heating chamber, (e) an air inlet in said first end portion of said preheating chamber communicating with one of said outer or inner air passages, (f) an air outlet adjacent said first end portion of said pre-heating chamber in fluid communication with the other of said outer or inner air passages.

(g) duct means in fluid communication between said air outlet and the air intake to said combustion chamber, whereby ambient air enters said air inlet and moves through said air passages to become heated, and is then discharged from said air outlet through said duct means to said air intake.

2. The invention according to claim 1 in which said air inlet communicates with said outer air passage and said air outlet communicates with said inner air passage.

3. The invention according to claim 2 in which said first end portion is a front end portion and said second end portion is a rear end portion, said front end portion being lower than said rear end portion.

4. The invention according to claim 3 in which said pre-heating chamber comprises a substantially semicylindrical outer wall and a radially inwardly spaced, substantially semi-cylindrical, inner wall, and a rear end wall joining said inner and outer walls to close the rear end of said pre-heating chamber, said partition wall also being substantially semi-cylindrical and being spaced between said outer and inner walls and spaced from said rear end wall to permit fluid communication between said outer and inner air passages.

5. The invention according to claim 4 further comprising a front end wall joining said inner wall and said partition wall to close the front end of said inner passage, said air inlet comprising a substantially arcuate opening communicating with said outer passage.

6. The invention according to claim 5 in which said air outlet comprises a stack adjacent said front end wall and communicating with said inner passage, said stack projecting upward through said outer passage and communicating with said duct means.

7. The invention according to claim 6 in which said pre-heating chamber comprises a pair of substantially horizontal, elongated, bottom walls joining the lower ends of said inner wall, said outer wall and said partition wall to close the corresponding lower portions of said inner and said outer passages, an auxiliary air inlet port in at least one of said bottom walls, an adjustable closure means for varying the effective air intake opening through said auxiliary port.

8. The invention according to claim 4 in which said mounting means supports said pre-heating chamber above the corresponding lower portion of said dryer chamber, and said substantially semi-cylindrical inner wall is concentrically, and slightly, spaced from the cylindrical outer surface of the rotary cylindrical dryer chamber.

* * * * *